United States Patent
Lohmiller et al.

(10) Patent No.: US 7,437,254 B2
(45) Date of Patent: Oct. 14, 2008

(54) METHOD FOR DETECTING ERRORS IN SENSOR VALUES AND ERROR DETECTION DEVICE

(75) Inventors: Winfried Lohmiller, Munich (DE); Christian Zecha, Groebenzell (DE)

(73) Assignee: EADS Deutschland GmbH, Ottobrunn (DE)

( * ) Notice: Subject to any disclaimer, the term of this patent is extended or adjusted under 35 U.S.C. 154(b) by 66 days.

(21) Appl. No.: 11/609,088

(22) Filed: Dec. 11, 2006

(65) Prior Publication Data

US 2007/0113629 A1   May 24, 2007

(51) Int. Cl.
*G01D 18/00* (2006.01)
*G01P 21/00* (2006.01)

(52) U.S. Cl. .................................... 702/85; 702/182

(58) Field of Classification Search ................... None
See application file for complete search history.

(56) References Cited

U.S. PATENT DOCUMENTS

| | | | | |
|---|---|---|---|---|
| 4,786,908 | A | 11/1988 | Runnalls | 342/63 |
| 5,630,409 | A | 5/1997 | Bono et al. | 128/200.18 |
| 5,936,573 | A * | 8/1999 | Smith | 701/213 |
| 6,233,522 | B1 | 5/2001 | Morici | 701/208 |
| 6,269,306 | B1 * | 7/2001 | Ibrahim et al. | 701/214 |
| 2004/0160365 | A1 * | 8/2004 | Riley et al. | 342/451 |
| 2005/0021284 | A1 * | 1/2005 | Gaal | 702/152 |

FOREIGN PATENT DOCUMENTS

| | | |
|---|---|---|
| DE | 3929404 | 3/1991 |
| DE | 36 36 131 | 8/1991 |
| DE | 1 0065920 | 2/2002 |
| DE | 1 0135586 | 2/2003 |
| EP | 1213562 | 6/2002 |
| WO | 01/48571 | 7/2001 |

OTHER PUBLICATIONS

English language abstract of DE 10135586, (Feb. 6, 2003).
English language abstract of DE 10065920, (Feb. 7, 2002).
English language abstract of DE 3929404, (Mar. 7, 1991).
"Gültigkeitsprüfung von Prozessinformationen mittels analytischer Redundanz und Paritätsraumdarstellung," R. Maletti et al., pp. 404-408, msr, Berlin 32, (1989).
"Ein allgemeines Konzept zur online-Messfehlererkennung in dynamischen Systemen mittels analytischer Redundanz (Online sensor fault detection in dynamical systems with the help of analytical redundancy (A process-independent formulation))," J. Prock, pp. 289-294, Automatisierungstechnik at 37 (1989).

* cited by examiner

*Primary Examiner*—Manuel L Barbee
(74) *Attorney, Agent, or Firm*—Greenblum & Bernstein, P.L.C.

(57) ABSTRACT

Method provided for implementation in a data processing device for monitoring a permissible integrity of a measured variable of a dynamic system with the steps: Determination of at least one measurement series with respectively one number (n) of measurements ($z_k$) by means of at least one sensor device with respectively one predetermined measuring accuracy ($\Delta z_k$) and a predetermined actual sensor integrity ($\{1-p_k\}$) related thereto, determination of a number (m) of measuring errors as a function of the actual sensor integrities ($\{1-p_k\}$), as a function of the number (n) of measurements and as a function of a minimum integrity ($\{1-p_0\}$), assignment of the determined accuracy range to an accuracy measurement, comparison of the determined accuracy measurement with a threshold value, and issuing a warning as soon as a desired value has been reached, fallen below or exceeded.

3 Claims, 5 Drawing Sheets

Alternative starting position $x_0$ and associated flight trajectory

METHOD FOR DETECTING ERRORS IN SENSOR VALUES AND ERROR DETECTION DEVICE

CROSS-REFERENCE TO RELATED APPLICATIONS

The present application is a U.S. National Stage Application of International Application No. PCT/DE2005/001314 filed Jul. 26, 2005, which published as WO 2006/012854 A1 on Feb. 9, 2006, the disclosure of which is expressly incorporated by reference herein in its entirety. Further, the present application claims priority under 35 U.S.C. § 119 and § 365 of German Application No. 10 2004 037 352.3 filed Jul. 30, 2004.

BACKGROUND OF THE INVENTION

1. Field of the Invention

The invention relates to a method for the error detection of sensor values and an error detection device.

The invention relates in particular to a method for error detection for a terrain elevation database-assisted navigation method for aircraft.

2. Description of Background Information

With the methods known from the general prior art for error detection of sensor values in dynamic systems, the comparison of sensor values determined in a similar or dissimilar manner is taken as the basis. A functional or instrumental redundancy is thereby used.

SUMMARY OF THE INVENTION

The aim of the invention is to provide a method with which the quality of a sensor value can be analytically determined in a suitable manner.

This aim is attained with the features of the independent claims. Further embodiments are given in the dependent claims related thereto.

According to the invention, a method for monitoring a reliable integrity of a measured variable of a dynamic system with the following steps is provided for implementation in a data processing device:

Determination of at least one measurement series with respectively one number of measurements by at least one sensor device with respectively one predetermined measuring accuracy and a predetermined actual sensor integrity related thereto, Determination of a number of measuring errors as a function of the actual sensor integrities, as a function of the number of measurements and as a function of a minimum integrity, Determination for each measurement of the measurement series of a range $X_k$ as measuring inaccuracy and, based on the measurement inaccuracy ranges $X_1, \ldots, X_n$ and the number m of measuring errors, determination of an accuracy range $X_0$ for the measured variable $x_0$ to be determined, so that the accuracy range $X_0$ contains the true measured variable $x_0$ with the predetermined minimum integrity $\{1-p_0\}$, Assignment of the determined accuracy range to an accuracy measurement, Comparison of the determined accuracy measurement with a threshold value, Issuing a warning as soon as a desired value has been reached, fallen below or exceeded.

The determination of the number of measuring errors can be carried out in particular by the rule:

$$\sum_{j=m+1}^{n} \frac{n!}{j!(n-j)!} p^j (1-p)^{n-j} < p_0$$

where $\{1-p\} = \{1-p_1\}, \ldots, \{1-p_n\}$ designates a sensor integrity uniform for the measurement series.

One advantage of the invention is that redundant functions or devices or components that are provided to ensure a minimum integrity can be omitted.

In particular, according to the invention a measured value with a relatively high integrity can be formed from a corresponding number of measurements that, considered per se, have a relatively low integrity.

In the particular application of determining position and altitude for an aircraft, the method according to the invention or the device according to the invention can be used in ensuring a predetermined minimum integrity or maintaining a maximum integrity risk. Integrity risk is defined as the probability of an error undetected or unreported in a system. Alternatively, the method according to the invention or the device according to the invention could determine an associated integrity on achieving a predetermined accuracy.

BRIEF DESCRIPTION OF THE DRAWINGS

The invention is described below, based on the attached figures. They show:

FIG. 2 a diagrammatic representation of an embodiment of the error detection device according to the invention, FIG. 3 a diagrammatic representation of an embodiment of the error detection device according to the invention for application for a navigation device for an aircraft, FIG. 4, for the application of the invention to a navigation method, the diagrammatic representation of a flown trajectory over a terrain profile and for comparison therewith a trajectory measured and recorded by an inertia sensor system available in the aircraft, whereby in addition a time scale is given, FIG. 5, for the application of the invention to a navigation method according to FIG. 4, an assumed starting position of the aircraft for an inertia sensor measurement and a course of the altitude above ground determined by an altimeter based on the given starting position of the aircraft and the profile of the true terrain in the area under the flown flight path, whereby an uncertainty or inaccuracy range for the determined course of the altitude over ground is shown by a gray-shaded region, and FIG. 6, for the application of the invention to a navigation method according to FIG. 4, an overlapping area to illustrate the determination of the integrity of a sensor value.

DETAILED DESCRIPTION OF THE INVENTION

According to the invention, a method implemented in a data processing device is provided for detecting when a predetermined integrity risk of a measured variable $x_0$ of a dynamic system has been exceeded, comprises supplying a current or time-dependent measured variable $x_0$ (or a series of such measured variables $x_0$) together with a determined accuracy or a determined accuracy range $X_0$ of this measured variable $x_0$.

The method according to the invention is to be used in cases where a number of n measurements from at least one sensor device are used to determine a measured variable $x_0$. An actual integrity, or an integrity specified, presumed or assumed for the individual device, which integrity is referred to below as actual integrity for short, is thereby assigned to the at least one sensor device. This actual integrity of the sensor device can be derived in particular from the sensor data determination method and/or the condition of the sensor device. In the event that several sensor devices are arranged or integrated for determining a measured variable in the method according to the invention, an actual integrity can be assigned to each sensor device individually. Then in turn an actual integrity for the entire sensor device, i.e., for several sensor devices, can be determined from several actual integrities. A sensor device can also include several sensors and/or also several data processing devices or also assigned functional units or devices, such as, e.g., filters, observers. In turn an actual integrity can be assigned to each of these sensors or data processing devices in order to be able to form an actual integrity for the sensor device therefrom.

This actual, if necessary assembled, integrity of the at least one sensor device is correlated to a required integrity definitive for the sensor value to be determined, as a function of a predetermined number n of measurements and as a function of the number m of measurement errors to be assumed, and the maximum number of permissible measurement errors m in order to ensure the required integrity is thereby determined.

In particular it can be provided according to the invention to determine the smallest number m, $0 \leq m \leq n$, for the maximum number of permissible measurement errors m by solving the inequality:

$$\sum_{j=m+1}^{n} \frac{n!}{j!(n-j)!} p^j (1-p)^{n-j} < p_0. \tag{1}$$

Alternatively, other values, i.e., values derived from the given values, can also be used in this inequality. For example, instead of $\{m+1\}$, the value $\{m\}$ can also be used, if the value $\{m-1\}$ is regarded or used as the maximum number of permissible measuring errors. The value $\{1-p_0\}$ is a required integrity for the measured value to be determined or a value derived therefrom. For an aircraft, this value can be, e.g., $1-10^{-4}$ per flight hour which corresponds to an integrity of $1-10^{-6}$ per respective determined value if 100 measurements per flight hour are assumed or predetermined. The value $p_0$ is a permissible integrity risk for the measured variable $x_0$. The value p can be taken to be a sensor integrity risk. The value $\{1-p\}$ is an actual or predetermined or measured integrity for the individual sensor device and/or the method implemented with the sensor device. This integrity is called the actual integrity for short below. With the use of several components within a sensor device and/or with the use of several sensor devices to determine a measured value, $\{1-p\}$ is formed from several actual integrities, e.g., by summation or multiplication of the same or through a mathematical formula in which the respectively relevant actual integrities are offset against one another.

With the method according to the invention, an accuracy range $X_0$ as small as possible of x values is thus determined from the measurement results $z_k$, the uncertainties or measuring inaccuracies $\Delta z_k$ and the deviation probabilities or sensor integrity risks $p_k$, which accuracy range $X_0$ contains the unknown parameter $x_0$ with a predetermined or required minimum integrity or minimum probability $\{1-p_0\}$. The accuracy range $X_0$ sought is then that quantity of x values that are contained simultaneously in at least $$\{n-m\}$$

inaccuracy ranges $X_k$. According to the invention, the smallest number m is therefore determined for which the above-mentioned inequality (1) is satisfied. The solution of the inequality (1) with boundary value takes place, e.g., by inserting values m and carrying out a comparison of the right and the left side of the inequality (1) and incrementing the value insertion until the inequality (1) is no longer satisfied.

The value for n is the number of measurements per measurement series. This number can be predetermined or fixed and depends on the application.

In the application concretely described, the number m is defined as a maximum permissible number of measurement errors that is compatible with the required minimum integrity $\{1-p_0\}$.

The described method can also be applied in all cases in which the probabilities $p_k$ for the occurrence of deviations within a measurement series are different. For this the value $p^j$ and the value $(1-p)^{n-j}$ are formed by a product of several individual probabilities $p_k$ or integrities $(1-p_k)$.

The described method can also be applied in cases in which the occurrence of the deviations is correlated.

From each of the n measurements of the measurement series a range is determined for the measured variable $x_0$ so that the measured variable $z_k$ determined by the at least one measurement device satisfies the measurement equation with the predetermined sensor integrity, i.e., $z(t_k, x_0) \in [z_k - \Delta z_k, z_k + \Delta z_k]$ is satisfied for the measurement equation relation.

In a further step according to the invention, an accuracy or an accuracy range $X_0$ is determined from the number of the predetermined measurements n and the maximum number of permissible measurement errors m that is compatible with the required minimum integrity $\{1-p_0\}$ with the number of n measurements by the at least one respective sensor device.

According to the invention, this accuracy or this accuracy range $X_0$ can be derived from the difference of the predetermined number of measurements n and the number of the maximum permissible measurement errors m. In particular the term $$\{n-m\}$$

can thereby be used to determine the accuracy of the measured values.

Figure 1:
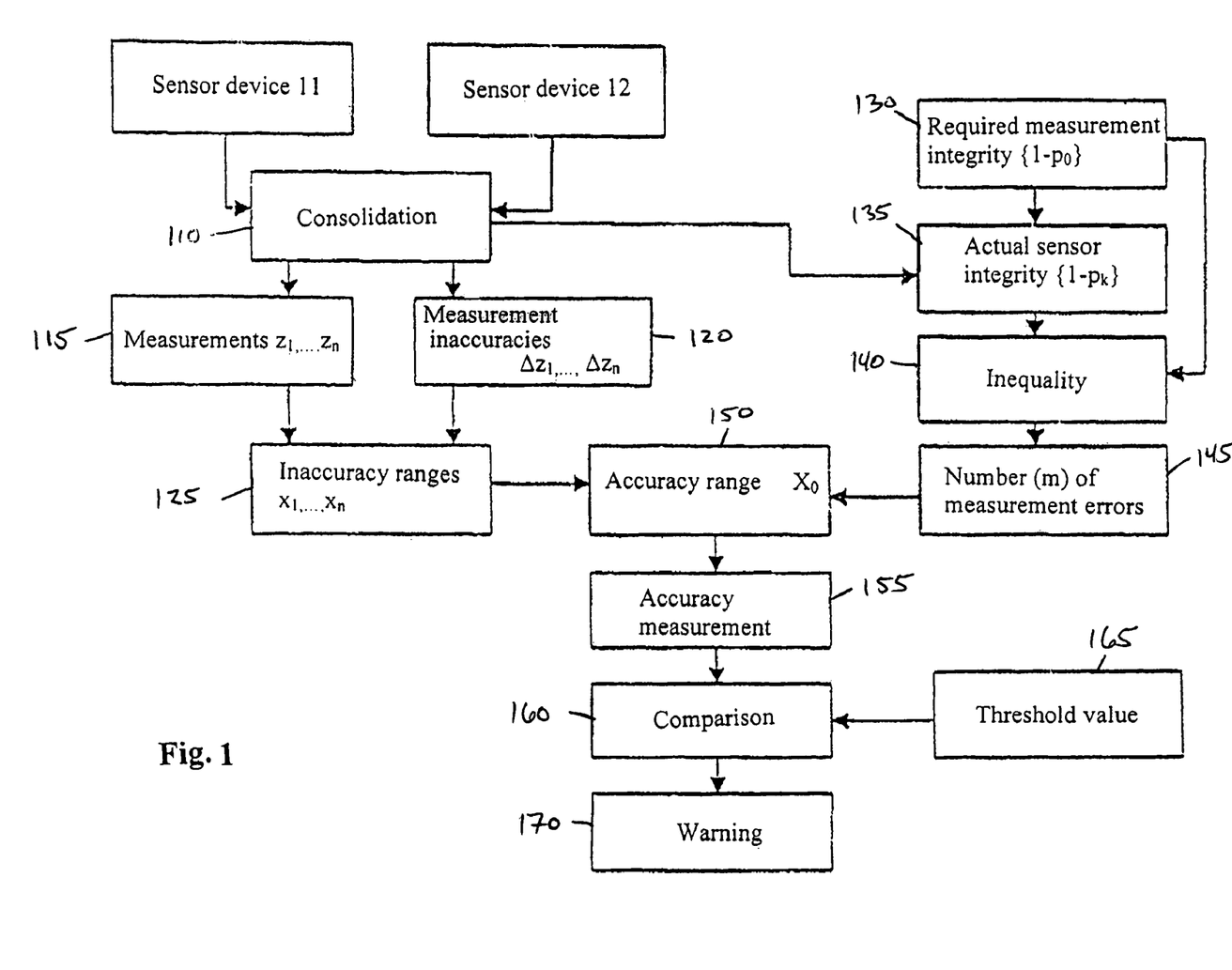
FIG. 1 a representation of steps of the method according to the invention.

As shown in FIG. 1, according to the invention, at step 115, at least one measurement series with respectively a number n of measurements $z_k$ is thus determined by at least one sensor device 11 with respectively one predetermined measurement inaccuracy $\Delta z_k$ (determined at step 120) and a predetermined actual sensor integrity $\{1-p_k\}$ (determined at step 135) based thereon. Subsequently, at step 145, a determination of a number m of measurement errors is carried out as a function of the actual sensor integrities $\{1-p_k\}$, as a function of the number n of measurements and as a function of a required minimum integrity $\{1-p_0\}$ (determined at step 130).

At step 125, for each measurement of the measurement series a measurement inaccuracy range $(X_k)$ is determined as measurement inaccuracy. At step 150, based on the measurement inaccuracy ranges $(X_1, \ldots, X_n)$ and the number (m) of measurement errors (determined at step 145), an accuracy range ($X_0$) is determined for the measured variable ($x_0$) to be determined so that the accuracy range ($X_0$) contains the true measured variable ($x_0$) with the predetermined minimum integrity $\{1-p_0\}$.

Subsequently, at step 155, an assignment is made of the determined accuracy range $X_0$ to an accuracy measurement.

At step 160, in a function for error monitoring, the determined accuracy range $X_0$ of the measured variable $x_0$ is compared to a predetermined threshold value or desired value for this accuracy. If the determined accuracy range $X_0$ of the measured variable $x_0$ does not reach the predetermined threshold value or desired value (determined at step 165), i.e., depending on the case, exceeds the predetermined threshold value or falls below the predetermined threshold value, at step 170, a sensor data deviation is transmitted to a system control 40, which can also be a component of the sensor device 11, or to a user interface 30. A function of the dynamic system is provided which processes this deviation depending on the application, whereby the occurrence of the deviation can lead directly or indirectly to system consequences. A direct consequence can thereby be that the non-achievement of the threshold value or desired value, e.g., does not lead to system consequences until a further occurrence of the non-achievement of the threshold value or desired value or only with further errors of the same or another sensor device or another component of the dynamic system. The system consequence can be that the system is switched off or switched to another mode of operation.

If sensor values of different sensor devices or different types of sensor values within the same sensor device are present, these sensor values together with the accuracy determined according to the invention and the minimum integrity for the respective sensor value or the sensor values can be fused in an estimate filter 23, in particular a Kalman filter, into a sensor value with one accuracy and/or integrity. The above-described function for error monitoring can also be connected downstream of this estimate filter 23, e.g., Kalman filter, and the deviation determined based on the integrity determined with the estimate filter 23. It can also be connected downstream of the estimate filter 23 as a monitoring function connected upstream in addition to the one filter.

Figure 2:
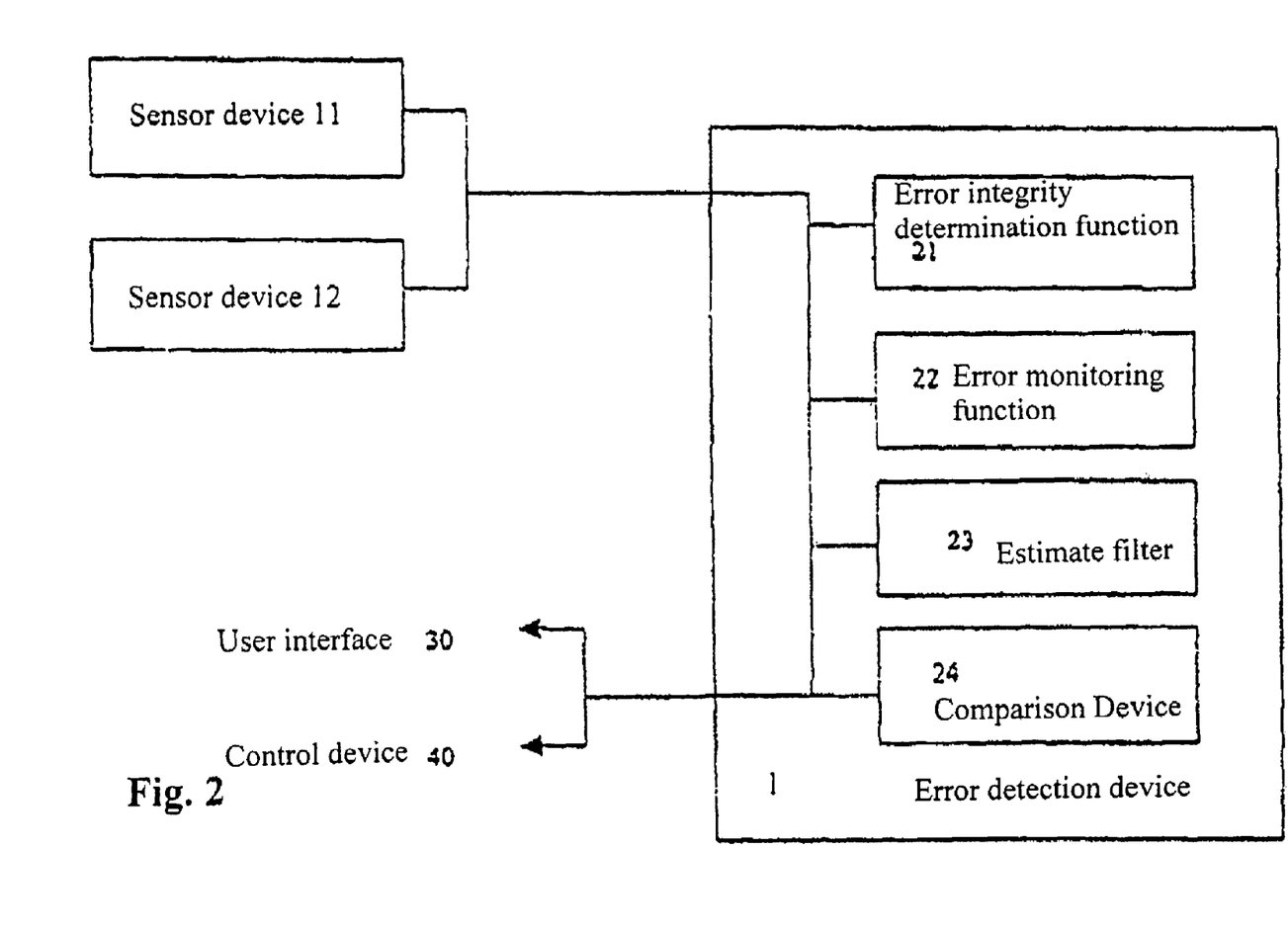

The error detection function or error detection device 1 according to the invention is connected to at least one first sensor device 11. Further sensor devices can also be assigned to the error detection device 1. FIG. 2 shows a special embodiment of the invention with another sensor device 12, thus with a total of two sensor devices. The error detection device 1 comprises a device or function for error integrity determination 21 and a device or function for error monitoring 22. The latter determines an integrity that can be assigned to the sensor values determined with the at least one sensor device, which integrity can be fed to further system functions of the dynamic system, e.g., a user interface 30 or a system control device 40.

Figure 3:
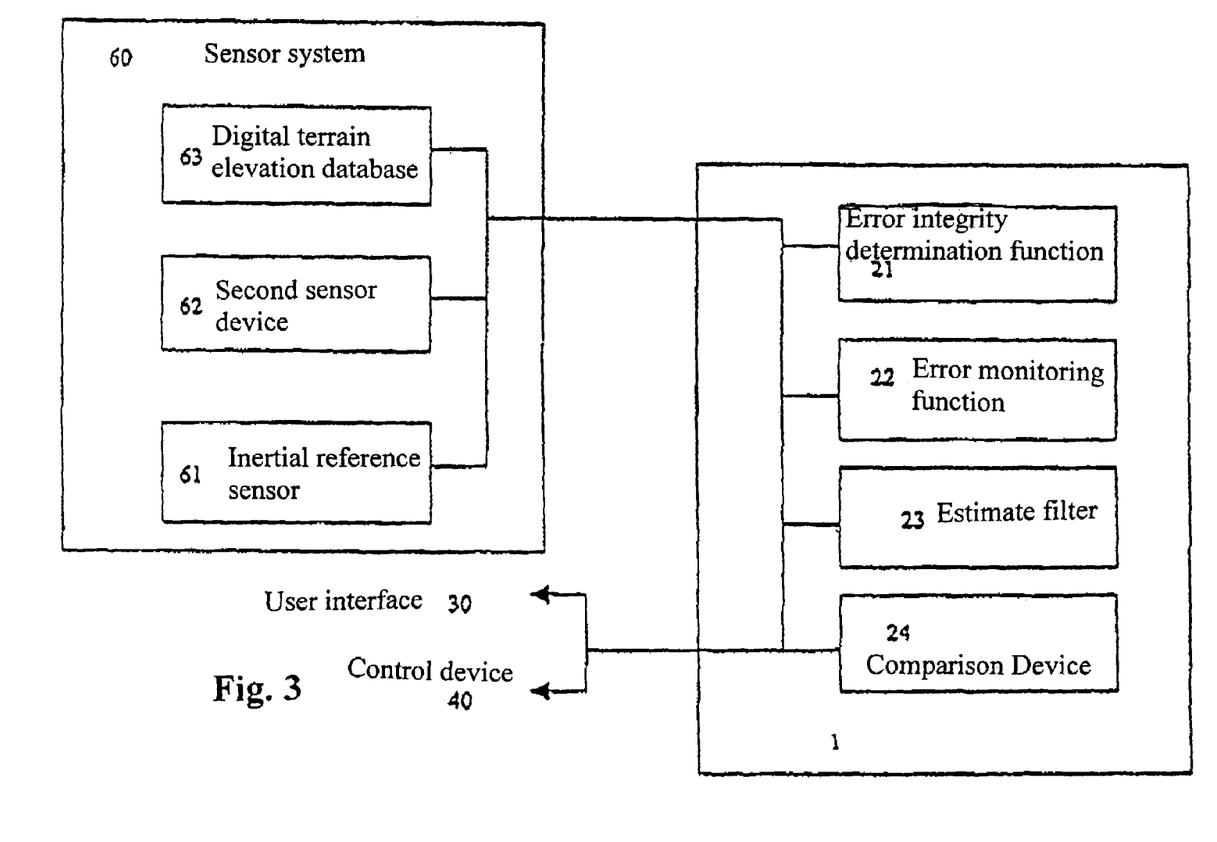

A special application of the method according to the invention or the device according to the invention to the navigation device of an aircraft is shown in FIG. 3 and described below. A sensor system 60 is thereby provided that comprises an inertial reference sensor 61 as a first sensor device and a second sensor device 62 that is connected to a digital terrain elevation database 63. The second sensor device 62 is thereby a sensor with which the determination of the current position of the aircraft with respect to the digital terrain data or with respect to the actual terrain is possible and can thereby be a radar altimeter, a laser altimeter or a sensor for receiving radio signals or satellite data. The error detection device 1 according to the invention can be connected downstream of this sensor system 60 (FIG. 3). The error detection device 1 according to the invention can alternatively also be a component of the sensor system 60.

Figure 5:
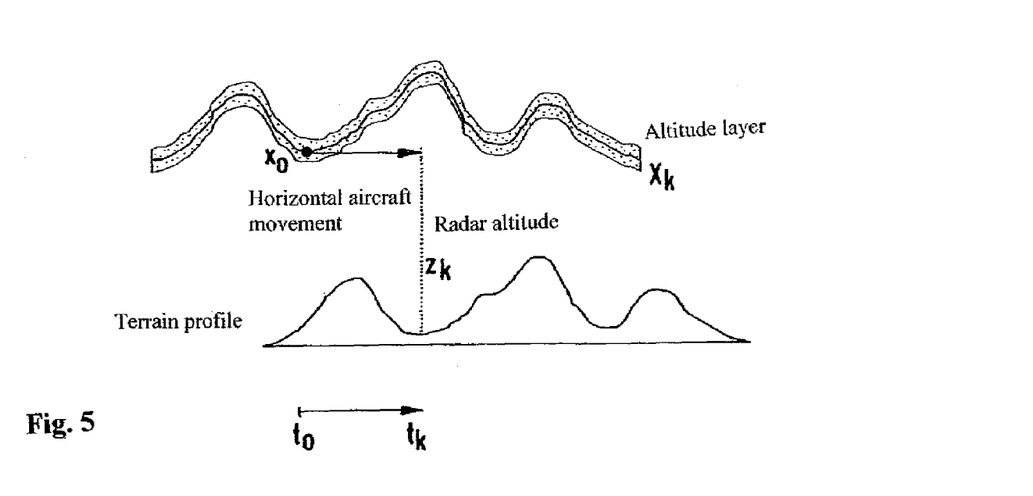

The inertial reference sensor device 61 provides measured values for current velocity vectors and the second sensor device 62 provides an altitude course over the digital terrain. However, this altitude course is displaced from the actual contour of the terrain flown over, since the starting point of the measured values from the inertial reference sensor device 61 is not precisely known. Furthermore, inaccuracies of the terrain data and the sensors themselves, e.g., in the inertial reference sensors or the radar altimeter, can be assumed. Moreover, errors can be assumed in the methods with which suitable operands for the navigation are derived from the actual sensor values, e.g., electric values of the inertial sensors. Through such errors the altitude course can be expanded into an altitude layer (FIG. 5).

The method that can be used in this case is preferably as follows:

The terrain elevation database-assisted navigation method according to the invention determines a multi-dimensional measured variable $x_0$ and thereby uses in particular a value $z(t,x_0)$ that depends on a parameter t and the other multi-dimensional measured variable $x_0$. In a preferred embodiment of the invention the parameter t stands for the time and the multi-dimensional measured variable $x_0$ for the 3-dimensional position of an aircraft at the time $t_0$ (starting position). The value $z(t,x_0)$ stands for the altitude of the aircraft above ground at the time t.

In the particular case of the use of a digital terrain elevation database as a navigational aid, the determination of the three-dimensional position is carried out by a determination of the current position of the aircraft with respect to the true terrain or with respect to the digital terrain of the terrain elevation database. This position of the aircraft with respect to the digital terrain is fused with the position information from the inertial reference sensor device 61. The altitude to be determined is the altitude above the real terrain altitude or the altitude above ground.

In the case of the formation of the sensor system 60 from an inertial reference sensor 61, an altimeter 62, which can be in particular a radar altimeter or a laser altimeter, and a digital terrain elevation database 63, the following are available to the error detection device 1 as input values from the sensor system 60:

Digital terrain data from the terrain elevation database 63 with a data delivery and data search function, Data for the altitude above ground from at least one altitude sensor for determining the contour of the terrain surface under the flight path flown by the aircraft, The accelerations of the aircraft measured by the inertial reference sensor 61, which accelerations are integrated, e.g., in the inertial reference sensor 61, into a three-dimensional velocity so that in particular the relative movement of the aircraft to a starting position is provided.

The data determined by the inertial reference sensor 61, that is the current velocity vectors or also the course of the flight path flown so far, are therefore determined without an accurate starting point. A representation by way of example of a measurement series in the form of a course of a flight path flown so far is provided in FIG. 4. The contour of the terrain surface under the flight path flown by the aircraft, which contour is determined at the same time or in a parallel process by the second sensor device 62 or the at least one altitude sensor, can therefore be spatially assigned only with a relatively great uncertainty to the terrain information based on the digital terrain data. This assignment and thus the position and altitude determination is made as follows according to the invention ensuring a predetermined minimum integrity $\{1-p_0\}$ or accuracy:

By way of explanation it is added that the accuracy and the integrity in general cannot be predetermined simultaneously. In the navigation method the minimum integrity $\{1-p_0\}$ is predetermined and the associated accuracy or the associated accuracy range $X_0$ then results from the method.

Figure 4:
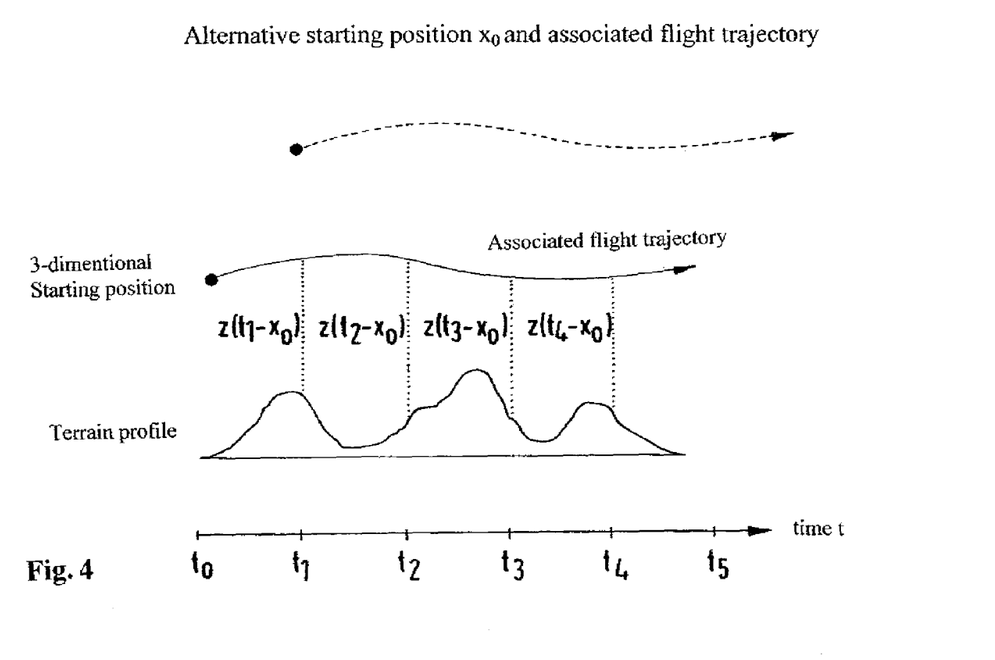

A course of the altitude above ground, i.e., the altitude above the true terrain, in the area under the flown flight path is determined with the altimeter. An example of a measurement series in the form of a determined altitude course is shown in FIG. 4. An assignment of the surface contour of the terrain respectively flown over determined from the measurements of various sensors to the digital terrain of the terrain elevation database would lead to a determination of the accurate position of the aircraft with respect to the time of the respective measurement series. The accuracy of a position determination of this type is thereby predetermined by the accuracy of the sensors and of the terrain elevation database.

A series of measurements of this type is available for several times: a series of a predetermined or situation-dependent number n of measurements or a set of respectively n measurements can be determined for each measurement time.

Since the starting point of the measurement series determined by the inertial reference sensor device 61 is inaccurate or uncertain, and since all measurements are flawed by errors that can be instrument-related or process-related, according to the invention a series of measurements of different sensors are fused with one another. In order to be able to apply a fusion of this type to systems that are critical in terms of safety, according to the invention an accuracy or an accuracy range that is compatible with the predetermined minimum integrity $\{1-p_0\}$ is also given for each determined value so that if a desired value is not reached, consequences can be taken in terms of system technology.

If the relative movement of the aircraft in the time from $t_0$ to t is known, e.g., from the inertial reference equipment, the flight trajectory at the times $t>t_0$ can be reconstructed for each starting position $x_0$.

The value $z(t,x_0)$ is now measured with fixed but unknown parameter $x_0$ at different times $t_k$, k=1 . . . n and produces the measured value $z_k$.

In the above-mentioned navigational application, the position $x_0$ of the aircraft at the time $t_0$ is unknown.

At the times $t_k$, k=1 . . . n respectively the altitude above ground $z_k$ is measured, e.g., with the aid of an altimeter and in particular of a radar altimeter.

The altitude profile of the area flown over is stored in a 3-dimensional terrain elevation database. In a further step, along the flight trajectory a section is made along the flown flight path through the 3-dimensional terrain elevation database that shows the terrain profile flown over.

The function $z(t,x_0)$, i.e., the altitude above ground, is determined from this. To this ends the difference is formed between the altitude profile of the flight trajectory and the terrain section. This function can be constructed for each starting position $x_0$ and is therefore known.

The measured values $z_k$ respectively have an uncertainty or measurement inaccuracy $\Delta z_k$ relative to the true value $z(t_k,x_0)$, i.e., the measured values lie with a probability $1-p_k$ within the range $$[z(t_k,x_0)-\Delta z_k, z(t_k,x_0)+\Delta z_k]$$

and with the probability $p_k$ outside this range. At this point no detailed knowledge of the probability distribution is thereby assumed. The uncertainty range can also be asymmetrical.

The case that a measured value $z_k$ lies outside the range $[z(t_k,x_0)-\Delta z_k, z(t_k,x_0)+\Delta z_k]$ is known as deviation or failure.

The occurrence of deviations or failures at the times $t_k$ can be uncorrelated or it can be correlated with respect to time in a specified manner.

In the navigational application according to the invention, deviations or failures can originate from the radar measurements or they can be caused by a defective terrain elevation database.

The predetermined minimum probability or minimum integrity $\{1-p_0\}$ is ensured by the method according to the invention, irrespective of which measurement results occur in each individual case. In the case of the above-mentioned navigational application, the method thus provides a spatial accuracy range $X_0$ that is as accurate as possible for the unknown position $x_0$ of the aircraft at the time $t_0$, and with a predetermined integrity of at least $\{1-p_0\}$.

In the method, an inaccuracy range $X_k$ is determined from x values for each time $t_k$, k=1 . . . n, based on the available measurement result $z_k$. Inaccuracy range $X_k$ includes all those parameters x for which no failure would occur, i.e., for which applies $z(t_k,x) \in [z_k-\Delta z_k, z_k+\Delta z_k]$.

In the navigational application, inaccuracy range $X_k$ is that 3-dimensional special range that is possible for the starting position $x_0$, without a failure occurring with the k-th radar measurement. This inaccuracy range $X_k$ is an altitude layer displaced by the altitude above ground $z_k$ and by the aircraft movement parallel to the terrain profile. It is assumed in FIG. 5 that the aircraft moves horizontally in the time from $t_0$ to $t_k$ and at the time $t_k$ measures the radar altitude $z_k$.

A possible starting position is labeled by $x_0$. The quantity of all possible starting positions is the altitude layer inaccuracy range $X_k$, half the thickness of which is $\Delta z_k$.

According to the invention, an accuracy range $X_0$ with the above-mentioned properties is constructed from the n inaccuracy ranges $X_k$, k=1 . . . n. If all failure probabilities $p_k$ are identical, i.e., $p_k=p$ for all k=1 . . . n, and if the occurrence of the failures is uncorrelated, the smallest number m, $0 \leq m \leq n$ is determined according to the method by solving the inequality:

$$\sum_{j=m+1}^{n} \frac{n!}{j!(n-j)!} p^j (1-p)^{n-j} < p_0. \quad (1)$$

The value for n is the number of measurements per measurement series. This number n can be predetermined or fixed and depends on the case. With respect to the measurement series of a radar altimeter, n is the number of radar altitude measurements that is used for a measurement series. In an alternative embodiment, the number n is fixed dynamically, i.e., as a function of the flight velocity or the terrain course such as, e.g., its roughness.

Figure 6:
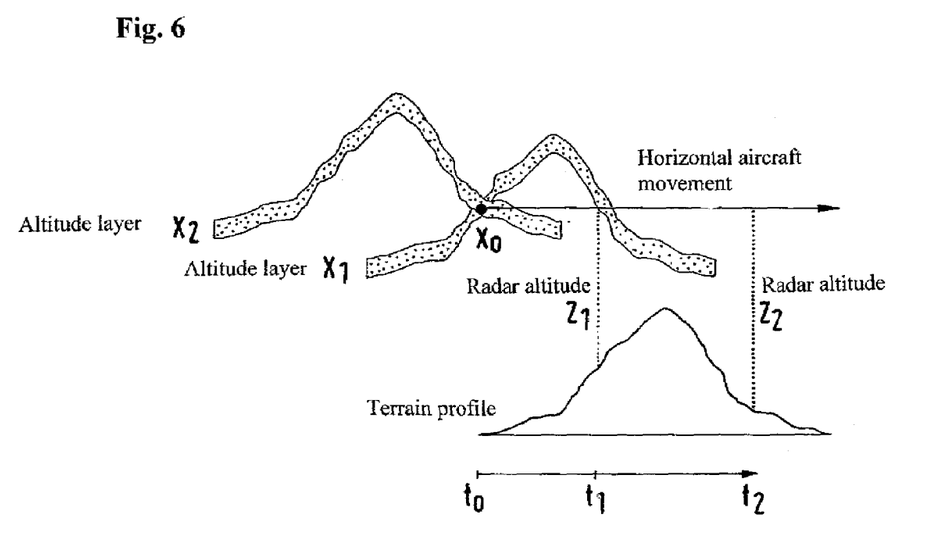

As shown in FIG. 6, in the navigational application, accuracy range $X_0$ is that range in which at least $\{n-m\}$ altitude layers, e.g., $X_1$ and $X_2$, overlap or intersect. Thus:

the unknown starting position $x_0$ of the aircraft must be simultaneously included in $\{n-m\}$ altitude layers, e.g., $X_1$ and $X_2$, so that the corresponding sensor value, e.g., $z_1$ or $z_2$, reaches or ensures the desired integrity of this starting position $x_0$ to be determined. With the use of an inertial reference sensor system 61, with an undetermined starting position $x_0$ of the measurement, an accuracy range $X_0$ is therefore determined in which the starting position $x_0$ is contained with predetermined minimum probability.

The sought accuracy range $X_0$ is then that quantity of x values that are simultaneously contained in at least $\{n-m\}$ inaccuracy ranges $X_k$.

In the event that several sensor values with associated integrities are determined, thus, e.g., when several sensor devices are provided, the integrities and the associated series of measured values are fed by at least two sensor devices preferably to an estimate filter 23, which is preferably a Kalman filter, that determines a measured value and an accuracy from these values.

The value determined by the estimate filter 23 and/or the accuracy can be compared to a threshold value in a comparison device 24. If the threshold value is reached or exceeded or fallen below depending on the case a warning signal can be emitted to an adjacent system device or system function, such as, e.g., a user interface, that can be, e.g., the display device in a cockpit. It can also be provided that the mode of operation of a flight control device as adjacent system device is chosen or changed based on a warning signal of this type. It can also be provided to switch off the sensor device causing the deviation and to proceed further in another mode of operation optionally including another sensor.

The invention claimed is:

1. A method for implementation in a data processing device for monitoring a permissible integrity of a measured variable of a dynamic system comprising:
    determining at least one measurement series with respectively a number (n) of measurements ($z_k$) by at least one sensor device with respectively one predetermined measuring accuracy ($\Delta z_k$) and a predetermined actual sensor integrity ($\{1-p_k\}$) related thereto;
    determining a number (m) of measuring errors as a function of the predetermined actual sensor integrities ($\{1-p_k\}$), as a function of the number (n) of measurements and as a function of a predetermined minimum integrity ($\{1-p_0\}$);
    determining for each measurement of the at least one measurement series of a measurement inaccuracy range ($X_k$) and, based on the measurement inaccuracy ranges ($X_1, \ldots, X_n$) and the number (m) of measuring errors, determination of an accuracy range ($X_0$) for a measured variable ($x_0$) to be determined, so that the accuracy range ($X_0$) contains the measured variable ($x_0$) with the predetermined minimum integrity $\{1-p_0\}$;
    assigning the accuracy range to an accuracy measurement;
    comparing the accuracy measurement with a threshold value; and
    issuing a warning as soon as a desired value has been reached, fallen below or exceeded.

2. A method for implementation in a data processing device for monitoring a permissible integrity of a measured variable of a dynamic system, comprising: determining a number (m) of measuring errors by using an inequality $$\sum_{j=m-1}^{n} \frac{n!}{j!(n-j)!} p^j (1-p)^{n-j} < p_0,$$

where $\{1-p\}=\{1-p_1\}, \ldots, \{1-p_n\}$ designates a uniform sensor integrity for a measurement series, n designates a number of measurements, p designates a sensor integrity risk, and $p_0$ designates a permissible integrity risk.

3. The method of claim 2, wherein the determining of the number of measuring errors comprises inserting values m into the inequality and carrying out a comparison of the right and left side of the inequality and incrementing the value m inserted into inequality until the inequality is no longer satisfied.

* * * * *